United States Patent
Zheng et al.

(10) Patent No.: US 8,953,508 B2
(45) Date of Patent: Feb. 10, 2015

(54) TMSI ALLOCATION DEVICE AND METHOD THEREOF, AND NETWORK ATTACHMENT AND LOCATION AREA UPDATE METHODS IN M2M COMMUNICATION

(75) Inventors: Wu Zheng, Shanghai (CN); Jimin Liu, Shanghai (CN); Qun Zhao, Shanghai (CN); Feng Han, Shanghai (CN); Kaibin Zhang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 130 days.

(21) Appl. No.: 13/701,079

(22) PCT Filed: Jun. 24, 2011

(86) PCT No.: PCT/IB2011/001780
§ 371 (c)(1),
(2), (4) Date: Nov. 30, 2012

(87) PCT Pub. No.: WO2011/161541
PCT Pub. Date: Dec. 29, 2011

(65) Prior Publication Data
US 2013/0070721 A1    Mar. 21, 2013

(30) Foreign Application Priority Data
Jun. 25, 2010    (CN) .......................... 2010 1 0212952

(51) Int. Cl.
*H04B 7/00*    (2006.01)
*H04W 8/26*    (2009.01)
*H04W 4/00*    (2009.01)
*H04W 60/00*    (2009.01)

(52) U.S. Cl.
CPC ................ *H04W 8/26* (2013.01); *H04W 4/005* (2013.01); *H04W 60/00* (2013.01)
USPC .......................................... 370/310

(58) Field of Classification Search
CPC .............. H04W 72/042; H04W 60/00; H04W 72/0406; H04W 74/0833
USPC .................................. 370/310–350
See application file for complete search history.

(56) References Cited

U.S. PATENT DOCUMENTS

2010/0098023 A1* 4/2010 Aghili et al. .................. 370/331

OTHER PUBLICATIONS

3GPP TR 23.888; 3rd Generation Partnership Project; Technical Specification Group Services and System Aspects; System Improvements for Machine-Type Communications; (Release 10); 3GPP TR 23.888V0.3.2 Mar. 1, 2010; pp. 1-33; XP007917755.

(Continued)

*Primary Examiner* — Fan Ng
(74) *Attorney, Agent, or Firm* — Carmen Patti Law Group, LLC

(57) ABSTRACT

The invention provides a temporary mobile station identity TMSI allocation method, comprising steps of: notifying a mobility management entity MME device of a corresponding mobility attribute based on a type of a Machine Type Communication MTC application, wherein the mobility attribute indicates whether a mobility of the MTC application is high or low; determining, by the MME device, a mobility layer associated with the MTC application according to the mobility attribute, and then allocating a TMSI from an available address space to a MTC device applying the MTC application based on a predetermined criterion, according to the determined mobility layer. The present invention further provides corresponding MTC server, MME device, network attachment method and location area update method.

20 Claims, 4 Drawing Sheets

(56) References Cited

OTHER PUBLICATIONS

3GPP ED; 3GPP TS 22.368; 3rd Generation Partnership Project; Technical Specification Group Services and System Aspects; Service Requirements for Machine-Type Communications (MTC); Stage 1; (Release 10); 3GPP TS 22.368 V10.1.0; Jun. 1, 2010; pp. 1-25; XP002661357; Retrieved from the Internet: URL:www.3gpp.org/ftp/Specs/archive/22_series/22.368/22368-b20.zip; [retrieved on Oct. 13, 2011].

Interdigital Communications et al; Options to handle Alternative to E.164 Numbers in Machine Type Communications; 3GPP Draft; S1-101007; 3rd Generation Partnership Project (3GPP); Mobile Competence Centre; 650, Route Des Lucioles; F-06921 Sophia-Antipolis Cedex; France; vol. SA WG1; No. Nice; 20100510; Apr. 30, 2010; XP050431841; [Retrieved on Apr. 3, 2010].

\* cited by examiner

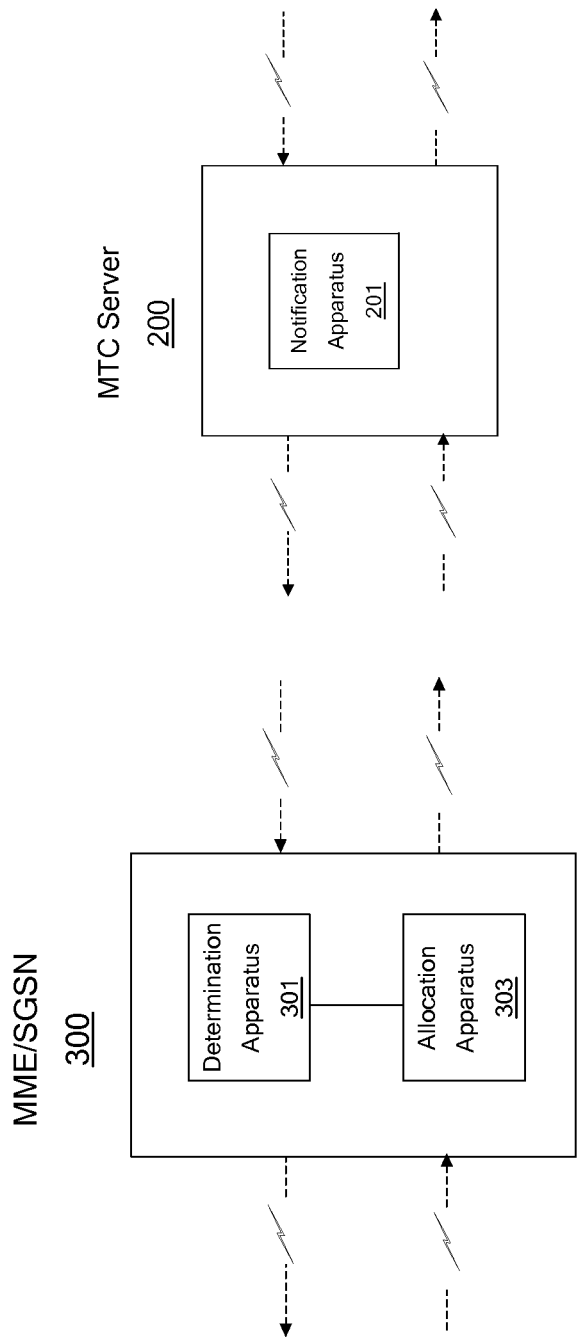

Network Attachment Process of MTC Device 500

TMSI ALLOCATION DEVICE AND METHOD THEREOF, AND NETWORK ATTACHMENT AND LOCATION AREA UPDATE METHODS IN M2M COMMUNICATION

BACKGROUND OF THE INVENTION

1. Field of Invention

The present invention relates to a TMSI (temporary mobile station identity) allocation scheme in a mobile communication, and particularly to a layered TMSI allocation scheme for a M2M (Machine-to-Machine) communication.

2. Description of Prior Art

A M2M communication is identified as a form of data communication which involves one or more entities that do not necessarily need human interaction. MTC (Machine Type Communication) services may involve a potentially very large number of communicating terminals, i.e. MTC devices, which is different from services that the current mobile network communication may provide.

The large number of MTC devices means the large addressing space requirement, which may go beyond a limitation that is defined for H2H (human-to-human) communications. When the MTC device is in a RRC (Radio Resource Control)-idle state, TMSI and IMSI (International Mobile Station Identity) are stored in a MME (Mobility Management Entity) or a SGSN (GPRS Serving Supporting Node) for paging the MTC device when a network-originated call comes. However, IMSI is a unique and fixed identity for the MTC device; it is very dangerous to broadcast IMSI at the air interface because of the possible track by enemies. Compared with IMSI, employing TMSI in the paging message is a relatively secure approach. TMSI is 32 bits long, whose allocation may be limited by the following factors.

- In order to avoid double allocation of TMSIs after a restart of an allocating node, some part of the TMSI may be related to the time when it is allocated or contain a bit field which is changed when the allocating node has recovered from the restart.
- In areas where both MSC-based circuit-switching services and SGSN-based packet-switching services are provided, some discrimination is needed between the allocation of TMSIs for MSC-based circuit-switching services and the allocation of TMSIs for SGSN-based packet-switching services. The discrimination should be done on 2 most significant bits, with values 00, 01, and 10 being used by the VLR (Visit Location Register) and 11 being used by the SGSN.
- If an intra-domain connection of RAN (Radio Access Network) nodes to multiple CN (Core Network) nodes as described in 3GPP TS 23.236 is applied in the MSC/VLR or SGSN, a NRI (Network Resource Identifier) should be a part of the TMSI. The NRI has a configurable length of 0 to 10 bits. A configurable length of 0 bits indicates that the NRI is not used and this feature is not applied in the MSC/VLR or SGSN. 10 bits of the NRI should be mapped to bits 23 to 14 from a highest bit to a lowest bit. For the NRI with N<10 bits, the Nth bit in a NRI field should be mapped to bit 23 of the TMSI, and the (N−1)th bit in the NRI field should be mapped to bit 22 of the TMSI, and so on.

After considering the aforementioned items, the available TMSI space will be reduced greatly. Thus, a problem of a potential TMSI identity exhaustion for the large number of the MTC devices is raised. A feasible TMSI allocation method capable of satisfying deployment requirements of the large number of the MTC devices in M2M communications is desired.

SUMMARY OF THE INVENTION

The present invention provides a solution to the potential TMSI identity exhaustion problem. The problem of a limited TMSI address space may be addressed by determining a mobility layer corresponding to a MTC application based on a mobility attribute associated with the MTC application, and applying a layered-TMSI allocation scheme according to the determined mobility layer.

According to one aspect of the present invention, a Machine Type Communication MTC server for a temporary mobile station identity TMSI allocation is provided. The MTC server comprises: a notification apparatus, configured for notifying a mobility management entity MME device of a corresponding mobility attribute based on a type of a MTC application, wherein the mobility attribute indicates whether a mobility of the MTC application is high or low, so that the MME device determines a mobility layer associated with the MTC application according to the mobility attribute, and allocates a TMSI from an available address space to a MTC device applying the MTC application based on a predetermined criterion, according to the determined mobility layer.

It is determined that on the mobility layer, a predetermined number of eNBs in a group of eNBs are comprised in a location area coverage of the MTC device, wherein the TMSI is uniquely allocated in the location area covering the group of eNBs.

The predetermined number of eNBs in the group of eNBs depends on the mobility attribute.

The predetermined criterion comprises: allocating the TMSI repeatedly for a plurality of MTC devices which are located on the same mobility layer and served by different groups of eNBs respectively; and allocating the TMSIs for a plurality of MTC devices which are located on different mobility layers in such a way that the respective allocated TMSIs only presents once on the different mobility layers.

According to another aspect of the present invention, a mobility management entity MME device for a temporary mobile station identity TMSI allocation is provided. The MME device comprises: a determination apparatus, configured for determining a mobility layer associated with a Machine Type Communication MTC application, according to a mobility attribute received from a MTC server, wherein the mobility attribute indicates whether a mobility of the MTC application is high or low; and an allocation apparatus, configured for allocating a TMSI from an available address space to a MTC device applying the MTC application based on a predetermined criterion, according to the determined mobility layer.

The determination apparatus is further configured for determining that on the mobility layer, a predetermined number of eNBs in a group of eNBs are comprised in a location area coverage of the MTC device, wherein the TMSI is uniquely allocated in the location area covering the group of eNBs.

The predetermined number of eNBs in the group of eNBs depends on the mobility attribute.

The predetermined criterion comprises: allocating the TMSI repeatedly for a plurality of MTC devices which are located on the same mobility layer and served by different groups of eNBs respectively; and allocating the TMSIs for a plurality of MTC devices which are located on different mobility layers in such a way that the respective allocated TMSI only presents once on the different mobility layers.

According to another aspect of the present invention, a temporary mobile station identity TMSI allocation method is provided. The method comprises steps of: notifying a mobility management entity MME device of a corresponding mobility attribute based on a type of a Machine Type Communication MTC application, wherein the mobility attribute indicates whether a mobility of the MTC application is high or low; determining, by the MME device, a mobility layer associated with the MTC application according to the mobility attribute, and then allocating a TMSI from an available address space to a MTC device applying the MTC application based on a predetermined criterion, according to the determined mobility layer.

The method further comprises: determining that on the mobility layer, a predetermined number of eNBs in a group of eNBs are comprised in a location area coverage of the MTC device, wherein the TMSI is uniquely allocated in the location area covering the group of eNBs.

The predetermined number of eNBs in the group of eNBs depends on the mobility attribute.

The predetermined criterion comprises: allocating the TMSI repeatedly for a plurality of MTC devices which are located on the same mobility layer and served by different groups of eNBs respectively; and allocating the TMSIs for a plurality of MTC devices which are located on different mobility layers in such a way that the respective allocated TMSI only presents once on the different mobility layers.

According to another aspect of the present invention, a network attachment method using the above TMSI allocation method is provided. The method comprises steps of: transmitting an attachment request message from a Machine Type Communication MTC device to an eNB, and forwarding the attachment request message from the eNB to a mobility management entity MME device, the attachment request message containing a MTC dedicated parameter; transmitting, by the MME device, a MTC feature request message via a home subscriber server HSS to a MTC server by using the MTC dedicated parameter; returning, by the MTC server, a MTC feature response message to the MME device, in response to the MTC feature request message, the MTC feature response message containing a mobility attribute based on a type of a MTC application, wherein the mobility attribute indicates whether a mobility of the MTC application is high or low; determining, by the MME device, a mobility layer associated with the MTC application according to the mobility attribute contained in the received MTC feature response message, and then sending an attachment accept message back to the MTC device via the eNB, the attachment accept message containing an indication of allocating a TMSI from an available address space to the MTC device applying the MTC application based on a predetermined criterion, according to the determined mobility layer.

The network attachment method further comprises: transmitting, by the MME device, an identity request for requesting an International Mobile Station Identity IMSI to the MTC device, if the MME device is not aware of the MTC device; and responding, by the MTC device, with the IMSI.

The network attachment method further comprises: forcing an authentication and a NAS security setup to be setup for activating an integrity protection and a NAS ciphering, in at least one of cases in which there is no context of the MTC device in a network, the attachment request message is not integrity-protected, and a check on the integrity protection is failed.

The network attachment method further comprises: sending, by the MME device, an update location request to the HSS, and then responding, by the HSS, to the update location request, in at least one of cases in which the MME device has changed since a last detachment, and there is no valid context information related to the MTC device in the MME device.

According to another aspect of the present invention, a location area update method using the above TMSI allocation method is provided. The method comprises steps of: transmitting a location area update request message from a Machine Type Communication MTC device to an eNB, and forwarding the location area update request message from the eNB to a current mobility management entity MME device; obtaining, by the current MME device, an address of an old MME device from a TA/RA/LA area update request message received from a MTC device, then transmitting a context request message to the old MME device; returning, by the old MME device, a context response message to the current MME device, in response to the context request message, the context response message containing a mobility attribute based on a type of a MTC application, wherein the mobility attribute indicates whether a mobility of the MTC application is high or low; determining, by the current MME device, a mobility layer associated with the MTC application according to the mobility attribute contained in the received context response message, and then sending a location area update accept message back to the MTC device via the eNB, the location area update accept message containing an indication of allocating a TMSI from an available address space to the MTC device applying the MTC application.

The location area update method further comprises: forcing to an authentication, if an integrity check on the location area update request message is failed.

The location area update method further comprises: transmitting, by the current MME device, a context acknowledgement message to the old MME device, the context acknowledgement message including a serving gateway change indication.

The location area update method further comprises: updating location information by exchanging information among the current MME device, the old MME device and the HSS.

Technical solutions of the present invention have advantages as follows:

1) The TMSI address space may be dynamically configure by considering various factors, e.g. mobility attributes, camp load, traffic load, etc;

2) Very small modifications are needed for the current specification; and

3) It is unnecessary for the MTC device to know the layered-TMSI allocations negotiated among the eNB, the MME, the HSS, etc, which are totally transparent to the terminals.

BRIEF DESCRIPTION OF THE DRAWINGS

The objects, advantages and characteristics of the present invention will be more apparent, according to descriptions of preferred embodiments in connection with the drawings, wherein:

FIG. 2 schematically shows a block diagram of a MTC server for a TMSI allocation according to an exemplary embodiment of the present invention;

FIG. 3 schematically shows a block diagram of a MME device for a TMSI allocation according to an exemplary embodiment of the present invention;

DETAILED DESCRIPTION OF PREFERRED EMBODIMENTS

Figure 1:
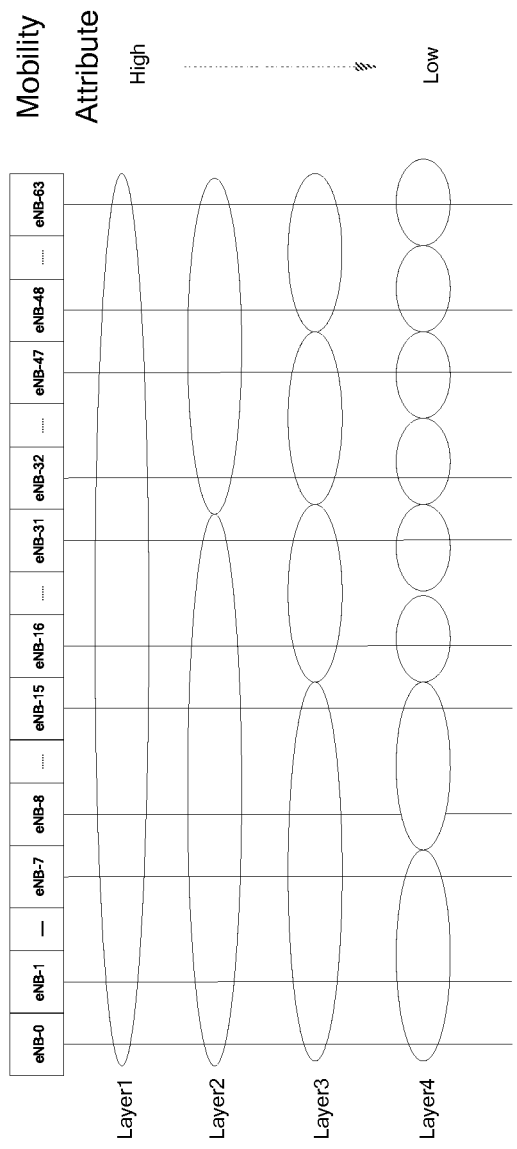
FIG. 1 shows a schematic diagram of a mobility layers divided based on mobility attribute of a MTC device according to an exemplary embodiment of the present invention.

Hereinafter, the present invention will be further described in detail by referring to the drawings and the exemplary embodiments in order to make the objects, technical scheme and advantages of the present invention more apparent. In exemplary embodiments, a 3GPP UMTS/EPS system is taken for an example. In this system, an example of a paging area for paging the mobile station as defined by a mobile operator is a TA/RA/LA (Location/Routing/Tracking) area, and the mobile station corresponds to a MTC device.

However, the skilled in the art will appreciate that the scope of the present invention is not limited to this. The exemplary embodiments are illustrative and only used for explaining the present invention, and should be regarded as examples of the present invention, but not be regarded as any limitations to the present invention. Any of schemes using the embodiments of the present invention falls within the protection scope of the present invention The present invention provides a layered-TMSI allocation scheme preferably applied in a M2M communication system.

As appreciated by the skilled in the art, various MTC applications may be represented by a set of characteristics, such as mobility, whether to time-control or to be delay sensitive etc. This implies that for various characteristics of the MTC applications, a utilization rate of system resources may be maximized under a condition of guaranteeing quality of service (such as delay, error rate, data rate etc.). Some examples of MTC applications are listed in Table 1. This list is not exhaustive and is intended to illustratively show the MTC communication applications.

TABLE 1

Examples of MTC Applications

| Service Area | MTC applications |
|---|---|
| Remote Maintenance/Control | Sensors |
| | Pumps |
| | Valves |
| | Vending machine control |
| Tracking & Tracing | Fleet Management |
| | Road tolling |
| Metering | Power |
| | Gas |
| | Water |
| | Heating |

Considering the illustrational MTC applications listed in Table 1, they correspond to different mobility attributes, e.g. the MTC device is normally located at a fixed place for metering and most remote maintenance/control applications; while relatively high mobility for fleet management applications and relatively low mobility for vending machine control applications.

This mobility attribute is usually invariable, which accords with the MTC applications employed by the MTC device. As for a H2H UE, it is very difficult to keep such a consistency, e.g. driving and staying at the office are totally different mobility attributes. Thus, the mobility attribute may be maintained in the MTC server or a server for recording user data in the operator network.

By utilizing the consistent mobility attributes bundled with the MTC applications, the layered-TMSI allocation scheme may be employed according to the indicated layers of the mobility attributes. FIG. 1 shows a schematic diagram of the mobility layers divided based on the mobility attribute of the MTC device according to an exemplary embodiment of the present invention.

As shown in FIG. 1, MME (or SGSN) defines a plurality of mobility layers (e.g. four levels in the example), so as to associate with the MTC applications having different mobility attributes. The division of "layers" in the present invention refers to the number of eNBs in the group of eNBs covered by the TA/RA/LA area of the MTC device applying the MTC application which is determined according to the mobility attribute, i.e., the mobility of the MTC application as identified by several bits.

In the exemplary embodiment of the present invention, assuming that there are 64 eNBs in the M2M communication system, the mobility layers may be divided as follows according to different mobility attributes as identified by different bits:

On Layer 2 corresponding to 01xxx . . . x, the number of the eNBs covered by the TA/RA/LA area of the MTC device may be set to be 32, which may be assumed to be $eNB_0$-$eNB_{31}$. MME may uniquely allocate the TMSI in the TA/RA/LA area of the MTC device as served by the group of eNBs ($eNB_0$-$eNB_{31}$). For another group of eNBs including $eNB_{32}$-$eNB_{63}$, the TMSI is also allocated uniquely in the area as served by $eNB_{32}$-$eNB_{63}$. However, it is allowed to separately allocate TMSIs in these two groups of eNBs. When the MTC device on this layer is moved from $eNB_i$ to $eNB_j$ ($0 \le i \le 31$, $32 \le j \le 63$), the MTC device will initiate the location update process, and MME may allocate a new TMSI to the MTC device for guaranteeing that the TMSI is unique in the coverage of the group of eNBs. On Layer 2, this is equivalent to enlarge the address space of TMSI twice.

On Layer 3 corresponding to 10xxx . . . x, the TMSI is uniquely allocated in the areas covered by four groups of eNBs ($eNB_0$-$eNB_{15}$, $eNB_{16}$-$eNB_{31}$, $eNB_{32}$-$eNB_{47}$, $eNB_{48}$-$eNB_{63}$) respectively. Only if the MTC device goes across corresponding groups of eNBs, the location update may occur. On Layer 3, this is equivalent to enlarge the address space of TMSI four times.

For instance, Layer 1 may be associated with the fleet management case, and the corresponding TA/RA/LA area may cover the cells served by 64 eNBs; Layer 3 may be associated with the vending machine control, and the corresponding TA/RA/LA area may cover the cells served by 16 eNBs; Layer 4 may be associated with metering, and the corresponding TA/RA/LA area may cover the cells served by 8 eNBs.

It should be noted that in the above examples of division of respective layers, the same number of eNBs is included in each group of eNBs. Actually, however, the number of eNBs in each group of eNBs may be defined and set freely. Prefixes 00xxx . . . x, 01 xxx . . . x, 10xxx . . . x and 11 xxx . . . x of respective layers only represent that the TMSI sets which may be allocated to respective layers are mutually exclusive, and their allocation may also be configured. Such a configuration may be based on policies such as coverage optimization, load balance etc. from OMC (Operation and Maintenance Center) of the operator.

As for the TMSI allocations in the TA/RA/LA areas on the same layer, the TMSIs belonging to the TA/RA/LA areas on the same layer may be allocated repeatedly, since these TA/RA/LA areas have different groups of eNBs which are related to the location of the MTC device. Taking Layer 2 as an example, one group contains the eNBs numbered from 0 to 31; and the other group contains the eNBs numbered from 32 to 63.

As for the TMSI allocations in the TA/RA/LA areas on different layers, the same TMSI may not be allocated repeatedly on different layers, i.e. a certain TMSI only appears once on different layers.

Generally, the number of eNBs contained in the TA/RA/LA area of the MTC device which has a higher mobility is larger, and the number of eNBs contained in the TA/RA/LA area of the MTC device which has a lower mobility is smaller. This extends the address space of TMSI on one hand; and on the other hand, the MTC device will initiate TAU/RAU/LAU (Tracking Area Update/Routing Area Update/Location Area Update) only if it goes across the defined coverage of the group of eNBs. When the TA/RA/LA is an area which is served by more eNBs, a relatively low UL (Uplink) load may be generated. When there is a call to the MTC device from the network, paging information may be broadcast in the coverage of this group of eNBs, which causes a higher DL (Downlink) load. In contrast, when the TA/RA/LA covers less eNBs, a relatively high UL load and a relatively low DL load may be obtained. That is, considering the mobility attribute of the MTC device, the number of eNBs in the group of eNBs covered by the TA/RA/LA area may also be a tradeoff between the DL and UL loads, dependent on actual requirements.

The basic principle of the present invention is that the MTC sever in the M2M communication system may notify the MME/SGSN of different mobility attribute indications defined by several bits, based on different MTC applications; and the MME/SGSN may determine the mobility layers associated with the mobility attribute according to the mobility attribute indication, and allocate the appropriate TMSI from the available address space to the MTC device.

In the M2M communication system applying the TMSI allocation method, the MTC server 200 for the TMSI allocation and the corresponding MME device 300 for the TMSI allocation are shown in FIGS. 2 and 3, respectively. FIGS. 2 and 3 further show apparatuses included in the MTC server 200 and the MME device 300 for implementing the present invention. It should be appreciated that FIGS. 2 and 3 only illustrate the internal apparatuses related to the present invention, and descriptions of well-known internal apparatuses are omitted for clarity and conciseness.

As shown in FIG. 2, the MTC server 200 may comprise a notification apparatus 201, configured for notifying the MME device 300 of a corresponding mobility attribute based on a type of a MTC application, wherein the mobility attribute indicates whether a mobility of the MTC application is high or low, so that the MME device 300 may determine a mobility layer associated with the MTC application according to the mobility attribute, and allocates a TMSI from an available address space to a MTC device applying the MTC application based on a predetermined criterion, according to the determined mobility layer. It may be determined that on the mobility layer, a predetermined number of eNBs in a group of eNBs are comprised in a location area coverage of the MTC device, wherein the TMSI is uniquely allocated in the location area covering the group of eNBs.

As shown in FIG. 3, the MME device 300 may comprise a determination apparatus 301 and an allocation apparatus 303.

The determination apparatus 301 may be configured for determining the mobility layer associated with the MTC application, according to the mobility attribute received from the MTC server 200, wherein the mobility attribute indicates whether a mobility of the MTC application is high or low. Additionally, the determination apparatus 301 may be further configured for determining that on the mobility layer, a predetermined number of eNBs in a group of eNBs are comprised in a location area coverage of the MTC device, wherein the TMSI is uniquely allocated in the location area covering the group of eNBs.

The allocation apparatus 303 may be configured for allocating the TMSI from an available address space to the MTC device applying the MTC application based on the predetermined criterion, according to the determined mobility layer.

The predetermined number of eNBs in the group of eNBs may depend on the mobility attribute.

The predetermined criterion may comprise: allocating the TMSI repeatedly for the plurality of MTC devices which are located on the same mobility layer and served by different groups of eNBs respectively; and allocating the TMSIs for the plurality of MTC devices which are located on different mobility layers in such a way that the respective allocated TMSI only presents once on the different mobility layers.

Figure 4:
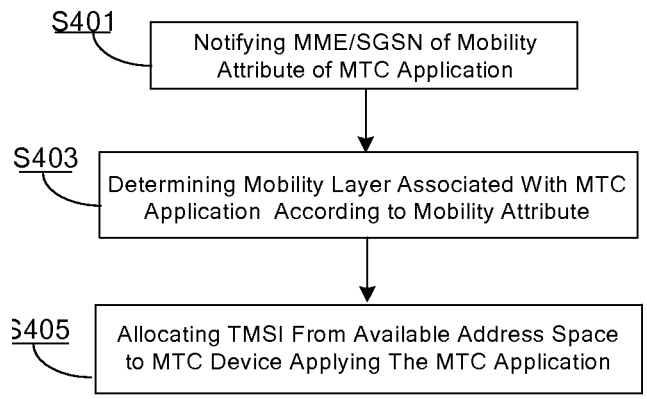
FIG. 4 shows a flowchart of a TMSI allocation method according to an exemplary embodiment of the present invention.

FIG. 4 shows a flowchart of a TMSI allocation method according to an exemplary embodiment of the present invention.

In step S401, the notification apparatus 201 in the MTC server 200 may notify the MME device 300 of a corresponding mobility attribute based on a type of the MTC application, wherein the mobility attribute indicates whether the mobility of the MTC application is high or low.

In step S403, the determination apparatus 301 in the MME device 300 may determine the mobility layer associated with the MTC application according to the mobility attribute. On the determined mobility layer, the predetermined number of eNBs in a group of eNBs are comprised in the location area coverage of the MTC device, wherein the TMSI is uniquely allocated in the location area covering the group of eNBs.

In step S405, the allocation apparatus 303 in the MME device 300 may allocate the TMSI from the available address space to the MTC device applying the MTC application based on the predetermined criterion, according to the determined mobility layer.

The layered-TMSI allocation method as proposed in the present invention can solve the potential TMSI exhaustion problem by utilizing the mobility attributes of MTC applications. As for implementations of a dynamic and layered-TMSI allocation, the network attachment procedure and the TA/RA/LA area update procedure which use the above TMSI allocation method are also be proposed in the present invention.

Figure 5:
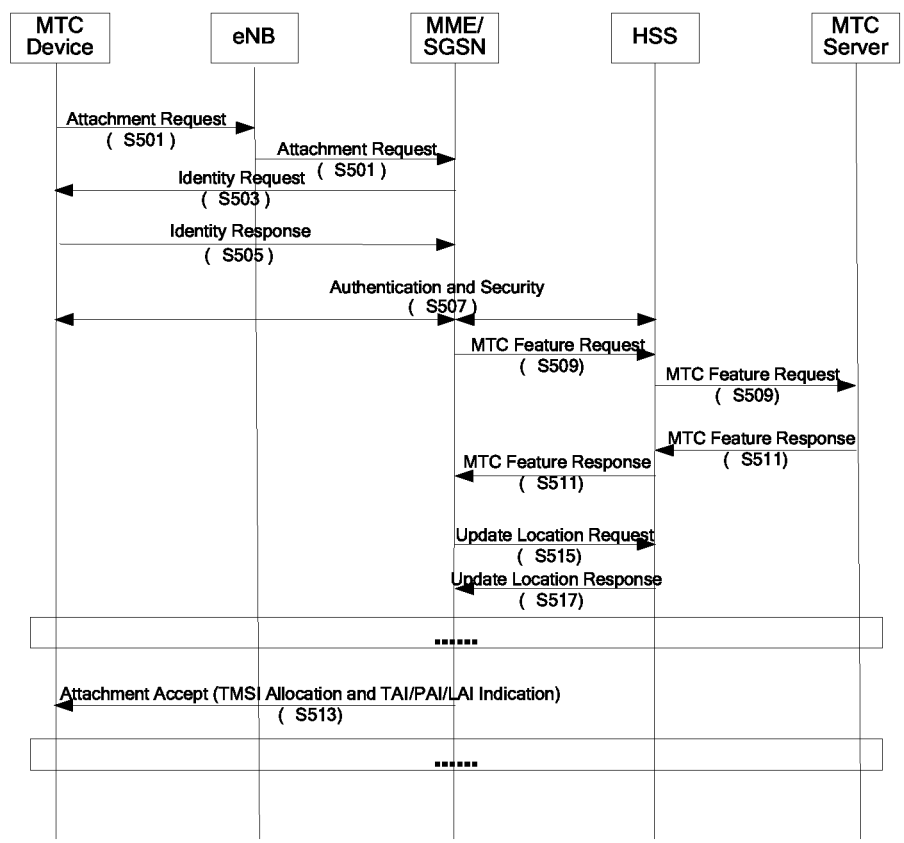
FIG. 5 shows a network attachment process flowchart using a TMSI allocation method according to an exemplary embodiment of the present invention.

Hereinafter, the network attachment process 500 using the TMSI allocation method according to an exemplary embodiment of the present invention will be described in connection with FIG. 5, wherein descriptions of steps of the network attachment process in the prior art are omitted, since they are well-known to the skilled in the art.

The Network attachment is a procedure employed by the MTC device to register with the network and to receive services. Particularly, In step S501, the MTC device may transmit an attachment request message to the eNB for initiating the attachment process. The attachment request message includes, besides some legacy parameters such as IMSI, attachment type etc., some MTC-dedicated parameters, e.g. a default access point name (APN), which may be used by the network to achieve MTC features from MTC server, or application category information, etc. The eNB may derive the MME/SGSN from the RRC parameters contained in the attachment request message, and forward the attachment request message and some parameters such as TAI/RAI/LAI to the MME/SGSN contained in a control message of the attachment request message.

In step S503, if the MTC device is unknown in the MME/SGSN, the MME/SGSN sends an Identity request to the MTC device to request the IMSI.

In step S505, the MTC device responds with the identity response (IMSI).

In step S507, if there is no context in the network, if the attachment request (sent in step S501) is not integrity-protected, or if the check on the integrity is failed, the authentication and NAS security setup may be forced to activate the integrity protection and NAS ciphering.

In step S509, the MME may send a MTC feature request message via a home subscriber server HSS to the MTC server by using the MTC dedicated parameter, so as to ask for the MTC features such as the mobility attribute of the MTC application for further configuration. The possible request path is MME/SGSN→HSS→MTC server, and maybe MTC gateway should be defined between HSS and MTC server for the message transfer.

In step S511, the MTC server may respond to the MTC feature request message with a MTC feature response message in a reverse path, i.e., MTC server→HSS→MME/SGSN. The MTC feature response message contains the mobility attribute based on the type of a MTC application, wherein the mobility attribute indicates whether a mobility of the MTC application is high or low.

The MME/SGSN may determine the mobility layer associated with the MTC application according to the mobility attribute contained in the received MTC feature response message, and send an attachment accept message back to the MTC device via the eNB in step S513. The attachment accept message contains an indication of allocating the TMSI from an available address space to the MTC device applying the MTC application based on the predetermined criterion, according to the determined mobility layer, including TAI/RAI/LAI list, TMSI etc. Then, the eNB indicates the corresponding parameters in the RRC connection reconfiguration message.

If the MME/SGSN has changed since the last detach, or if there is no valid subscription context for the UE in the MME/SGSN, etc., step S515 may be performed, wherein the MME/SGSN may send an update location request to the HSS. Then in step S517, the HSS may respond to the update location request. Hereinafter, the TAU/RAU/LAU process 600 using the TMSI allocation method according to an exemplary embodiment of the present invention will be described in connection with FIG. 6, wherein descriptions of steps of the TAU/RAU/LAU process in the prior art are omitted, since they are well-known to the skilled in the art.

Figure 6:
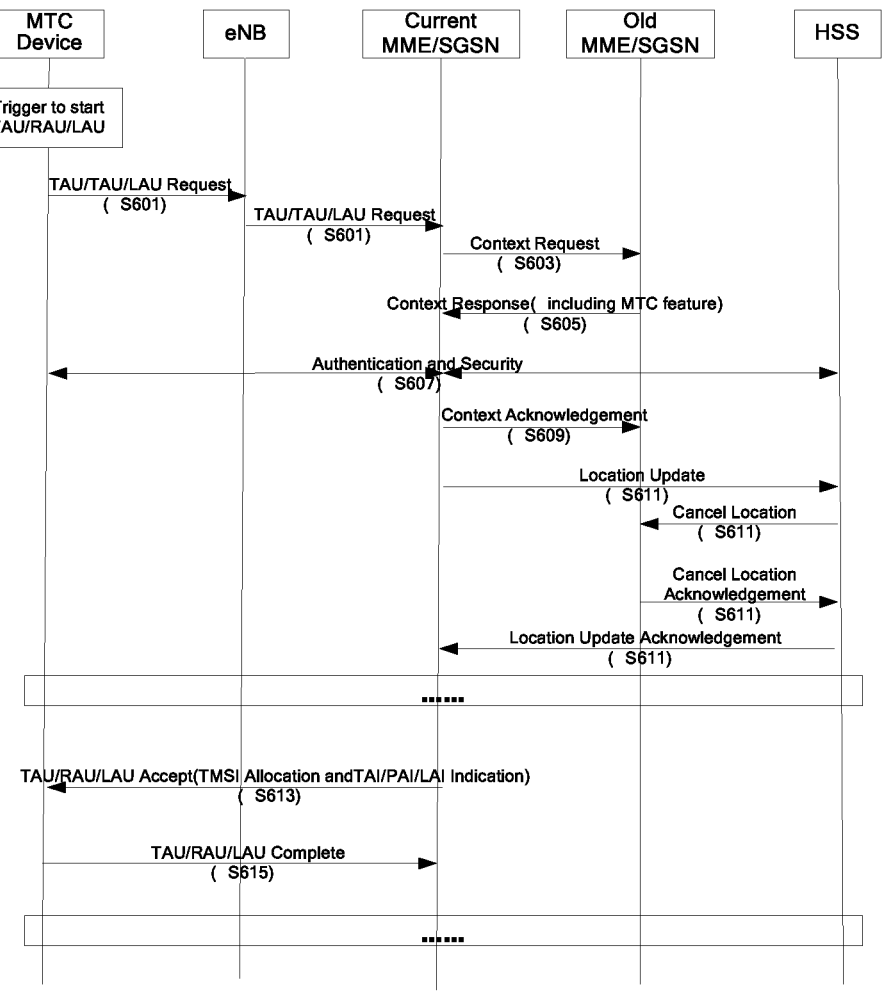
FIG. 6 shows a location area update process flowchart using a TMSI allocation method according to an exemplary embodiment of the present invention.

The location management function provides a mechanism for the network to know the TA/RA/LA area for the MTC device in the RRC-idle state. For example, when the MTC device detects that it has entered a new TA/RA/LA area that is not in the list of TAI/RAI/LAIs (Location Area Identifier/Routing Area Identifier/Tracking Area Identifier) that the MTC device registered with the network, or a periodic TA/RA/LA update timer has expired etc, the MTC device will implement TAU/RAU/LAU operations. As shown in FIG. 6, the TAU/RAU/LAU processes are depicted as follows.

In step S601, the MTC device may initiate the TAU/RAU/LAU procedure by sending a TAU/RAU/LAU request message to the eNB. The TAU/RAU/LAU request message contains some parameters, e.g. MTC device core network capability, old GUTI (Global Unique Temporary Identity, which is allocated by MME when the UE performs an attachment or TAU/RAU/LAU), last visited TAI/RAI/LAI, etc. The eNB may derive the MME/SGSN from the RRC parameters, and forward the TAU/RAU/LAU request message together with some parameters, e.g. TAI/RAI/LAI, etc.

In step S603, the current MME/SGSN may use the GUTI contained in the TAU/RAU/LAU request message received from the MTC device to derive the old MME/SGSN address, and send a context request message, including old GUTI, complete TAU/RAU/LAU Request message, etc., to the old MME/SGSN to retrieve user information.

Then in step S605, the old MME/SGSN may respond to the current MME/SGSN with a context response message. The context response message comprises, besides the legacy information such as IMSI, MSISDN, MM Context, the mobility attribute based on the type of the MTC application, wherein the mobility attribute indicates whether the mobility of the MTC application is high or low.

If the integrity check of TAU/RAU/LAU request message sent in step S601 is failed, an authentication may be forced in step S607.

In step S609, the current MME/SGSN may send a context acknowledgement message, including serving gateway change indication, to the old MME/SGSN.

In step S611, the location information may be updated by exchanging information among the current MME/SGSN, the old MME/SGSN and the HSS.

The current MME/SGSN may determine the mobility layer associated with the MTC application according to the mobility attribute contained in the context response message received in step S605, and then in step S613, send a TA/RA/LA area update accept message back to the MTC device via the eNB. The TA/RA/LA area update accept message contains an indication of allocating the TMSI from the available address space to the MTC device applying the MTC application, including TAI/RAI/LAI list, TMSI, etc.

In step S615, the MTC device may acknowledges the received message by returning a TAU/RAU/LAU complete message to the MME/SGSN.

The M2M communication is a very promising technique because of the potential great amount of machines connected to the network. When a large number of MTC device are introduced, the current RAN and CN designs cannot satisfy the requirements, and a TMSI exhaustion problem may occur.

In the present invention, the layered-TMSI allocation scheme based on the mobility attributes bundled with the MTC applications is proposed, so as to address the problem of the limited TMSI address space.

Technical solutions of the present invention have advantages as follows:

1) The TMSI address space may be dynamically configure by considering various factors, e.g. mobility attributes, camp load, traffic load, etc;

2) Very small modifications are needed for the current specification; and

3) It is unnecessary for the MTC device to know the layered-TMSI allocations negotiated among the eNB, the MME, the HSS, etc, which are totally transparent to the terminals.

The above is only the preferred embodiments of the present invention and the present invention is not limited to the above embodiments. Therefore, any modifications, substitutions and improvements to the present invention are possible without departing from the spirit and scope of the present invention.

The invention claimed is:

1. A Machine Type Communication (MTC) server for a temporary mobile station identity (TMSI) allocation, comprising:
    a notification apparatus, configured for notifying a mobility management entity (MME) device of a corresponding mobility attribute based on a type of a MTC application, wherein the mobility attribute indicates whether a mobility of the MTC application is high or low, so that the MME device determines a mobility layer associated with the MTC application according to the mobility attribute, and allocates a TMSI from an available address space to a MTC device applying the MTC application based on a predetermined criterion, according to the determined mobility layer.

2. The MTC server according to claim 1, wherein it is determined that on the mobility layer, a predetermined number of Evolved Node Bs (eNBs) in a group of eNBs are comprised in a location area coverage of the MTC device, wherein the TMSI is uniquely allocated in the location area covering the group of eNBs.

3. The MTC server according to claim 2, wherein the predetermined number of eNBs in the group of eNBs depends on the mobility attribute.

4. The MTC server according to claim 2, wherein the predetermined criterion comprises:
    allocating the TMSI repeatedly for a plurality of MTC devices which are located on the same mobility layer and served by different groups of eNBs respectively; and
    allocating the TMSIs for a plurality of MTC devices which are located on different mobility layers in such a way that the respective allocated TMSI only presents once on the different mobility layers.

5. A mobility management entity (MME) device for a temporary mobile station identity (TMSI) allocation, comprising:
    a determination apparatus, configured for determining a mobility layer associated with a Machine Type Communication (MTC) application, according to a mobility attribute received from a MTC server, wherein the mobility attribute indicates whether a mobility of the MTC application is high or low; and
    an allocation apparatus, configured for allocating a TMSI from an available address space to a MTC device applying the MTC application based on a predetermined criterion, according to the determined mobility layer.

6. The MME device according to claim 5, wherein the determination apparatus is further configured for determining that on the mobility layer, a predetermined number of Evolved Node Bs (eNBs) in a group of eNBs are comprised in a location area coverage of the MTC device, wherein the TMSI is uniquely allocated in the location area covering the group of eNBs.

7. The MME device according to claim 6, wherein the predetermined number of eNBs in the group of eNBs depends on the mobility attribute.

8. The MME device according to claim 6, wherein the predetermined criterion comprises: allocating the TMSI repeatedly for a plurality of MTC devices which are located on the same mobility layer and served by different groups of eNBs respectively; and allocating the TMSIs for a plurality of MTC devices which are located on different mobility layers in such a way that the respective allocated TMSIs only presents once on the different mobility layers.

9. A temporary mobile station identity (TMSI) allocation method, comprising steps of:
    notifying a mobility management entity (MME) device of a corresponding mobility attribute based on a type of a Machine Type Communication (MTC) application, wherein the mobility attribute indicates whether a mobility of the MTC application is high or low;
    determining, by the MME device, a mobility layer associated with the MTC application according to the mobility attribute, and then allocating a TMSI from an available address space to a MTC device applying the MTC application based on a predetermined criterion, according to the determined mobility layer.

10. The TMSI allocation method according to claim 9, further comprising: determining that on the mobility layer, a predetermined number of Evolved Node Bs (eNBs) in a group of eNBs are comprised in a location area coverage of the MTC device, wherein the TMSI is uniquely allocated in the location area covering the group of eNBs.

11. The TMSI allocation method according to claim 10, wherein the predetermined number of eNBs in the group of eNBs depends on the mobility attribute.

12. A network attachment method using the TMSI allocation method according to claim 11, comprising steps of:
    transmitting an attachment request message from a Machine Type Communication MTC device to an eNB, and forwarding the attachment request message from the eNB to a mobility management entity MME device, the attachment request message containing a MTC dedicated parameter;
    transmitting, by the MME device, a MTC feature request message via a home subscriber server (HSS) to a MTC server by using the MTC dedicated parameter;
    returning, by the MTC server, a MTC feature response message to the MME device, in response to the MTC feature request message, the MTC feature response message containing a mobility attribute based on a type of a MTC application, wherein the mobility attribute indicates whether a mobility of the MTC application is high or low;
    determining, by the MME device, a mobility layer associated with the MTC application according to the mobility attribute contained in the received MTC feature response message, and then sending an attachment accept message back to the MTC device via the eNB, the attachment accept message containing an indication of allocating a TMSI from an available address space to the MTC device applying the MTC application based on a predetermined criterion, according to the determined mobility layer.

13. A location area update method using the TMSI allocation method according to claim 11, comprising steps of:
    transmitting a location area update request message from a Machine Type Communication MTC device to an eNB, and forwarding the location area update request message from the eNB to a current mobility management entity MME device;
    obtaining, by the current MME device, an address of an old MME device from a Location/Routing/Tracking (TA/RA/LA) area update request message received from a MTC device, then transmitting a context request message to the old MME device;
    returning, by the old MME device, a context response message to the current MME device, in response to the context request message, the context response message containing a mobility attribute based on a type of a MTC application, wherein the mobility attribute indicates whether a mobility of the MTC application is high or low;

determining, by the current MME device, a mobility layer associated with the MTC application according to the mobility attribute contained in the received context response message, and then sending a location area update accept message back to the MTC device via the eNB, the location area update accept message containing an indication of allocating a TMSI from an available address space to the MTC device applying the MTC application.

14. The TMSI allocation method according to claim 10, wherein the predetermined criterion comprises: allocating the TMSI repeatedly for a plurality of MTC devices which are located on the same mobility layer and served by different groups of eNBs respectively; and allocating the TMSIs for a plurality of MTC devices which are located on different mobility layers in such a way that the respective allocated TMSI only presents once on the different mobility layers.

15. A network attachment method using the TMSI allocation method according to claim 14, comprising steps of:
 transmitting an attachment request message from a Machine Type Communication MTC device to an eNB, and forwarding the attachment request message from the eNB to a mobility management entity MME device, the attachment request message containing a MTC dedicated parameter;
 transmitting, by the MME device, a MTC feature request message via a home subscriber server (HSS) to a MTC server by using the MTC dedicated parameter;
 returning, by the MTC server, a MTC feature response message to the MME device, in response to the MTC feature request message, the MTC feature response message containing a mobility attribute based on a type of a MTC application, wherein the mobility attribute indicates whether a mobility of the MTC application is high or low;
 determining, by the MME device, a mobility layer associated with the MTC application according to the mobility attribute contained in the received MTC feature response message, and then sending an attachment accept message back to the MTC device via the eNB, the attachment accept message containing an indication of allocating a TMSI from an available address space to the MTC device applying the MTC application based on a predetermined criterion, according to the determined mobility layer.

16. A network attachment method using the TMSI allocation method according to claim 10, comprising steps of:
 transmitting an attachment request message from a Machine Type Communication MTC device to an eNB, and forwarding the attachment request message from the eNB to a mobility management entity MME device, the attachment request message containing a MTC dedicated parameter;
 transmitting, by the MME device, a MTC feature request message via a home subscriber server (HSS) to a MTC server by using the MTC dedicated parameter;
 returning, by the MTC server, a MTC feature response message to the MME device, in response to the MTC feature request message, the MTC feature response message containing a mobility attribute based on a type of a MTC application, wherein the mobility attribute indicates whether a mobility of the MTC application is high or low;
 determining, by the MME device, a mobility layer associated with the MTC application according to the mobility attribute contained in the received MTC feature response message, and then sending an attachment accept message back to the MTC device via the eNB, the attachment accept message containing an indication of allocating a TMSI from an available address space to the MTC device applying the MTC application based on a predetermined criterion, according to the determined mobility layer.

17. A location area update method using the TMSI allocation method according to claim 10, comprising steps of:
 transmitting a location area update request message from a Machine Type Communication MTC device to an eNB, and forwarding the location area update request message from the eNB to a current mobility management entity MME device;
 obtaining, by the current MME device, an address of an old MME device from a Location/Routing/Tracking (TA/RA/LA) area update request message received from a MTC device, then transmitting a context request message to the old MME device;
 returning, by the old MME device, a context response message to the current MME device, in response to the context request message, the context response message containing a mobility attribute based on a type of a MTC application, wherein the mobility attribute indicates whether a mobility of the MTC application is high or low;
 determining, by the current MME device, a mobility layer associated with the MTC application according to the mobility attribute contained in the received context response message, and then sending a location area update accept message back to the MTC device via the eNB, the location area update accept message containing an indication of allocating a TMSI from an available address space to the MTC device applying the MTC application.

18. A network attachment method using the TMSI allocation method according to claim 9, comprising steps of:
 transmitting an attachment request message from a Machine Type Communication MTC device to an eNB, and forwarding the attachment request message from the eNB to a mobility management entity MME device, the attachment request message containing a MTC dedicated parameter;
 transmitting, by the MME device, a MTC feature request message via a home subscriber server (HSS) to a MTC server by using the MTC dedicated parameter;
 returning, by the MTC server, a MTC feature response message to the MME device, in response to the MTC feature request message, the MTC feature response message containing a mobility attribute based on a type of a MTC application, wherein the mobility attribute indicates whether a mobility of the MTC application is high or low;
 determining, by the MME device, a mobility layer associated with the MTC application according to the mobility attribute contained in the received MTC feature response message, and then sending an attachment accept message back to the MTC device via the eNB, the attachment accept message containing an indication of allocating a TMSI from an available address space to the MTC device applying the MTC application based on a predetermined criterion, according to the determined mobility layer.

19. A location area update method using the TMSI allocation method according to claim 9, comprising steps of:
 transmitting a location area update request message from a Machine Type Communication MTC device to an eNB, and forwarding the location area update request message from the eNB to a current mobility management entity MME device;

obtaining, by the current MME device, an address of an old MME device from a Location/Routing/Tracking (TA/RA/LA) area update request message received from a MTC device, then transmitting a context request message to the old MME device;

returning, by the old MME device, a context response message to the current MME device, in response to the context request message, the context response message containing a mobility attribute based on a type of a MTC application, wherein the mobility attribute indicates whether a mobility of the MTC application is high or low;

determining, by the current MME device, a mobility layer associated with the MTC application according to the mobility attribute contained in the received context response message, and then sending a location area update accept message back to the MTC device via the eNB, the location area update accept message containing an indication of allocating a TMSI from an available address space to the MTC device applying the MTC application.

20. The location area update method according to claim 19, further comprising: updating location information by exchanging information among the current MME device, the old MME device and the HSS.

* * * * *